United States Patent
Hobisch et al.

(10) Patent No.: US 9,017,471 B2
(45) Date of Patent: Apr. 28, 2015

(54) DEFOAMERS FOR AIRLESS PAINT SPRAY APPLICATION

(75) Inventors: Gerald Hobisch, Graz (AT); Peter Morre, Graz (AT); Thomas Schönbacher, Kalsdorf (AT); Joachim Schmidt, Frauental A. D. Lassnitz (AT); Armin Temel, Graz (AT)

(73) Assignee: Allnex Austria GmbH, Werndorf (AT)

( * ) Notice: Subject to any disclaimer, the term of this patent is extended or adjusted under 35 U.S.C. 154(b) by 72 days.

(21) Appl. No.: 13/498,645

(22) PCT Filed: Aug. 31, 2010

(86) PCT No.: PCT/EP2010/062730
§ 371 (c)(1), (2), (4) Date: May 23, 2012

(87) PCT Pub. No.: WO2011/036039
PCT Pub. Date: Mar. 31, 2011

(65) Prior Publication Data
US 2012/0240820 A1    Sep. 27, 2012

(30) Foreign Application Priority Data
Sep. 28, 2009 (EP) .................... 09171551

(51) Int. Cl.
| C08L 91/00 | (2006.01) |
| C09D 4/00 | (2006.01) |
| C09D 101/00 | (2006.01) |
| C09D 201/00 | (2006.01) |
| B01D 19/04 | (2006.01) |
| C08G 65/332 | (2006.01) |
| C09D 5/02 | (2006.01) |
| C09D 7/12 | (2006.01) |
| C09D 171/02 | (2006.01) |
| C08L 33/04 | (2006.01) |

(52) U.S. Cl.
CPC ........ *B01D 19/0404* (2013.01); *C08G 65/3322* (2013.01); *C09D 5/021* (2013.01); *C09D 7/125* (2013.01); *C09D 171/02* (2013.01); *C08L 33/04* (2013.01); *C08L 2201/54* (2013.01)

(58) Field of Classification Search
USPC .................................. 106/268, 243, 244, 245
See application file for complete search history.

(56) References Cited

U.S. PATENT DOCUMENTS

| 2,829,112 A | 4/1958 | Solomon |
| 3,337,595 A | 8/1967 | Lamont |
| 3,691,091 A | 9/1972 | Koerner |
| 3,763,021 A | 10/1973 | Householder |
| 4,092,266 A | 5/1978 | Abel et al. |
| 4,209,333 A | 6/1980 | Ong et al. |
| 4,895,681 A | 1/1990 | Herrmann et al. |
| 5,545,351 A * | 8/1996 | Riggs et al. ............ 516/133 |
| 7,150,915 B2 * | 12/2006 | Kia et al. ............ 428/423.7 |
| 2003/0139297 A1* | 7/2003 | Quintero ............ 507/100 |
| 2008/0021117 A1* | 1/2008 | Puetz et al. ............ 516/133 |

FOREIGN PATENT DOCUMENTS

| DE | 1067003 B | 9/1955 |
| DE | 1914684 A1 | 12/1970 |
| DE | 3636086 A1 | 4/1988 |
| EP | 0264826 A2 | 4/1988 |
| GB | 1383175 A | 2/1975 |
| WO | WO-2005113691 A1 | 12/2005 |

OTHER PUBLICATIONS

International Search Report for PCT/EP2010/062730 mailed Dec. 14, 2010.

* cited by examiner

*Primary Examiner* — James McDonough
(74) *Attorney, Agent, or Firm* — Drinker Biddle & Reath LLP

(57) ABSTRACT

The invention relates to an ester AB of a polypropylene glycol A with fatty acids B, which ester AB can be added in the form of an aqueous emulsion to an aqueous coating composition, and a method of use of the ester AB as defoamer additive.

13 Claims, No Drawings

DEFOAMERS FOR AIRLESS PAINT SPRAY APPLICATION

CROSS-REFERENCE TO RELATED APPLICATIONS

This application is a national stage application (under 35 U.S.C. §371) of PCT/EP2010/062730, filed Aug. 31, 2010, which claims benefit of European application 09171551.6, filed Sep. 28, 2009.

FIELD OF THE INVENTION

The invention relates to defoamer additives comprising fatty acid esters of polyoxyalkylene glycols, and a method of using these said additives to reduce or inhibit the formation of foams in aqueous coating composition materials comprising adding these said additives to these said aqueous coating systems.

BACKGROUND OF THE INVENTION

In many industrial processes, surface-active substances are employed in order to obtain desired effects. For instance, aqueous coating compositions require a range of auxiliary products and additives, examples including emulsifiers needed to emulsify the water-insoluble binders, or additives to improve substrate wetting, and pigment dispersion. An undesirable side effect of these surface-active substances, however, is that they stabilise, in the form of foam, air which may be introduced in the course of preparation or application of the said coating compositions.

Use of organic silicon compounds in the form of oils, especially of dimethylpolysiloxanes of low to medium viscosity, as an additive for defoaming aqueous solutions or dispersions has been known, and has been described, for example, in the book by W. Noll "Chemie and Technologie der Silicone", Weinheim 1968 [Chemistry and Technology of Silicones]. The defoaming activity of antifoaming agents based on organic silicon compounds, and also of defoamers based on mineral oil can be improved by adding highly disperse inorganic or organic substances, especially the so-called pyrogenic silica grades as described in DE 10 67 003 B and DE 1 914 684 C3. Defoamers based on polyoxy-alkylene-polysiloxane copolymers have ben described in U.S. Pat. No. 3,763,021. While these defoamer additives are suitable to suppress or reduce the propensity to foaming in polymer dispersions or aqueous coating compositions, aqueous coating compositions comprising these additives exhibit also disadvantages which are attributable to the defoamer additives. High-gloss emulsion paint systems to which polysiloxanes, polyoxyalkylene-polysiloxane copolymers or formulations based on mineral oil have been added to suppress or reduce formation of foam have shown wetting defects, and also have reduced gloss when applied to surfaces. Wetting of the substrate is not uniform across the area covered which leads to the formation of coating films of varied thickness and defective zones in the coating film. There are also problems of interlayer adhesion associated with the use of defoamers based on organic silicon compounds, craters appear in the coating films particularly if the coating compositions are applied by dipping the substrate into a tank filled with a coating composition. If volatile compounds evolved during drying and stoving are fed to catalytic combustion units as is habitually in industrial coating, the service life of the catalysts is reduced by the silicon content.

Defoamers based on mineral oil are prone to reduce the gloss of emulsion paints, and lead, in flexographic printing inks, to unwanted swelling of the flexographic plates.

In DE 36 36 086 A1, fatty acid esters of polyglycerol polyglycol ethers are disclosed that are obtained by conventional reaction of polyglycerols with ethylene oxide, propylene oxide or their mixtures, and esterifying the resulting alkylene oxide adduct with fatty acids. Foam prevention properties of these products still need to be improved with regard to the limited service time of these compounds in the paint.

None of the systems known heretofore, however, provides satisfactory results for such coating compositions that are applied by the so-called airless spray technology.

As is known, the airless spray technology does not use compressed air to transport the coating composition through the spray nozzle, and to form small droplets of paint. Instead, paint is pumped at increased fluid pressures (3.4 MPa to 44.8 MPa, 500 psi to 6500 psi) through a small opening at the tip of the spray gun to achieve formation of small droplets, referred to as "atomisation" by the person skilled in the art. Pressure is generally supplied to the gun by an air-driven reciprocating fluid pump. When the pressurised paint enters the low pressure region in front of the gun, the sudden drop in pressure causes the paint to "atomise". Airless systems are most widely used by painting contractors and maintenance painters. Airless spraying has several distinct advantages over air spray methods. This method is more efficient than the air spray because the airless spray is softer and less turbulent, thus less paint is lost in bounce back. The droplets formed are generally larger than conventional spray guns and produce a heavier paint coat in a single pass. This system is also more easily portable. Production rates are nearly double, and transfer efficiencies are usually greater (ranging from 65% to 70% of the paint used). Other advantages include the ability to utilise high-viscosity coatings (without the need of adding solvents to reduce the viscosity) and its ability to have good penetration in recessed areas of a workpiece. The major disadvantage of the airless spray is that due to the thick layer buildup and high viscosity of the airless coating formulations the resulting films are very sensitive to form pinholes and air entrapments and the demands for defoaming reagents are very high.

OBJECT OF THE INVENTION

It is therefore an object of the invention to provide defoamer formulations which are free from organic silicon compounds and from mineral oil, which exhibit a good defoaming action in polymer dispersions and in aqueous coating systems comprising such dispersions, and which can be used in airless spray applications.

SUMMARY OF THE INVENTION

It has been found that aqueous emulsions of fatty acid esters of polypropylene glycol, optionally in mixture with waxes, effectively suppress excessive formation of foam, and lead to coating films which are essentially free from defects.

A further advantage of these said aqueous emulsions is the absence of ingredients based on organic silicon compounds, as well as the absence of components which contribute to the content of coating compositions so modified to the volatile organic compounds content (VOC).

The subject of this invention is therefore an ester AB of polypropylene glycol A with fatty acids B, which ester AB can be added in the form of an aqueous emulsion to an aqueous coating composition.

A further subject of the invention are coating compositions which can be applied via the airless spray method, wherein the said coating compositions comprise an ester AB as defoamer additive.

DETAILED DESCRIPTION OF THE PREFERRED EMBODIMENTS

The ester AB preferably has an average ratio of the number v(-OH) of non-esterified hydroxyl groups per molecule which remain as such in the ester, to the number v(-O—CO—R) of esterified hydroxyl groups of not more than 9 (=1.8:0.2). It has been found that a degree of esterification which is higher (average ratio of v(-OH) to v(-O—CO—R) of less than 9, and down to 0) leads to a better defoaming activity. An increase in the degree of esterification, equivalent to a ratio as defined supra of not more than 4 provides particularly good results.

The polypropylene glycol A is preferably a linear homopolymer having the structure

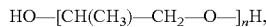

HO—[CH(CH$_3$)—CH$_2$—O—]$_n$H, where n is chosen such that the minimum number average molar mass $M_n$ is at least 1800 g/mol, preferably at least 1900 g/mol, and particularly preferably at least 1950 g/mol. It has been found that the defoaming activity is particularly good if the number average molar mass $M_n$ is at least 2000 g/mol. There has not been an upper limit of $M_n$ as regards the defoaming activity; however, as the viscosity of the ester reaches high values, dispersibility and ease of handling is impaired if $M_n$ is larger than 8000 g/mol. A range between 2000 g/mol and 4000 g/mol, including these limits, has been found to be particularly useful in terms of defoaming activity and ease of handling. Mixtures of polyoxypropylene glycols of differing molar mass may also be used, provided that the average obeys the relations mentioned supra.

For the purpose of this invention it is also possible to use a branched polyoxypropylene glycol derived from a propoxylated trivalent alcohol, or more than trivalent alcohol. Such branched compounds are also enclosed in the term "polypropylene glycols" in the context of this invention. A part of up to 30% of the oxypropylene moieties in the polyoxypropylene glycol A may also be replaced by oxyethylene moieties. Such mixed polyethers are also enclosed in the term "polypropylene glycols" in the context of this invention. Exceeding this limit reduces the defoaming activity possibly through a too high degree of hydrophilicity.

The fatty acid B has a number of carbon atoms of from 4 to 22 carbon atoms, and may be saturated or (multiply) unsaturated. Preferred are saturated fatty acids B1 having from 12 to 20 carbon atoms, particularly stearic and palmitic acids, their mixtures, and also mixtures of single fatty acids B1 such as stearic acid, with mixtures B2 of fatty acids derived from natural sources which are also preferably low in unsaturation, such as coconut oil fatty acid or cottonseed fatty acid. It is also preferred to use mixtures of fatty acids derived from natural sources which have been hydrogenated to reduce, or eliminate essentially all remaining unsaturation. Particularly preferred are such mixtures of B1 and B2 where a single unsaturated aliphatic fatty acid B1 has a mass fraction of at least 25%, more preferably, of at least 40%, in the mass of the mixture of the single fatty acid B1 with the mixture fatty acids B2. Particularly good defoaming activity was found when using a mixture of stearic acid and coconut oil fatty acid or hydrogenated natural fatty acid mixtures derived from naturally occurring oils for the purposes of this invention.

The defoaming activity can be further increased if a wax C is added to the ester AB. A preferred wax C has hydrophilic structures, such as an amide wax which is an amide of a mixture of long chain aliphatic carboxylic acids having from 12 to 40 carbon atoms. Diamides or amides of dimeric fatty acids are also useful in this context. Particularly preferred are such amides derived from primary or secondary diamines such as alpha,omega alkylene diamines having from 3 to 10 carbon atoms, and two molecules of aliphatic monocarboxylic acids.

The defoaming activity can be further increased if an emulsifier D is added to the ester AB. This emulsifier D is preferably of the ethoxylated fatty acid type, such as ethoxylated stearic acid itself, or mixtures comprising these, or fatty acid esters of ethoxylated sugar alcohols such as the fatty acid ester of sorbitan ethoxylate.

Particulary good results are obtained if both an emulsifier D and a wax C are added to the ester AB.

The defoamers according to this invention can be used in any aqueous coating systems, but is particularly preferred to be used in conjunction with aqueous epoxy resin dispersions. The mass fraction of defoamer in such a mixture is usually from 0.1% to 3%, to obtain optimum performance.

The defoamer effect is particularly pronounced in aqueous coating systems having a viscosity (before addition of the defoamer) of at least 500 mPa·s.

The invention is further illustrated by the examples as described infra.

EXAMPLES

In the examples and also the specification and claims of this application, the following definitions are used:

"AN" or acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

Mass fraction $w_s$ of solids in a solution or dispersion is determined according to DIN 55671, by taking a sample, in this case 0.7 g, and drying at a predefined temperature, in this case 150° C., for ten minutes. Calculation is done by $w_s = m_R/m_B$, where $m_R$ is the mass remaining after drying, and $m_B$ is the mass of the sample.

Dynamic viscosity of a sample is measured according to DIN EN ISO 3219, at a shear rate of 100 s$^{-1}$, at a temperature of 23° C.

Example 1

Preparation of an Ester Defoamer D1

Into a heated reaction vessel equipped with a stirrer, a reflux condenser, a water trap, and a nitrogen inlet, 2000 g of polypropylene glycol having a number average molar mass $M_n$ of 2000 g/mol, 224 g of stearic acid, 0.2 g of dibutyltin dilaurate, 0.2 g of triphenylphosphite and 200 g of xylene were charged and heated under stirring under a blanket of nitrogen to 240° C. within two hours. Water was removed by azeotropic distillation at 240° C. and under atmospheric pressure until an acid number of less than 5 mg/g was reached. Then, 52 g of coconut oil fatty acid were added, and the xylene circulation was maintained until the acid number of less than 5 mg/g was again attained. The solvent was then removed, by distillation under reduced pressure, keeping this temperature constant. A liquid reaction product having a mass fraction of solids of 97% and a dynamic viscosity of 292 mPa·s. The ratio of the number of hydroxyl groups in the polypropylene glycol to the number of acid groups in stearic and coconut oil fatty acids was 2:1.

Example 2

Preparation of an Ester Defoamer D2

Into a heated reaction vessel equipped with a stirrer, a reflux condenser, a water trap, and a nitrogen inlet, 2000 g of polypropylene glycol having a number average molar mass $M_n$ of 2000 g/mol, 90 g of stearic acid, 0.2 g of dibutyltin dilaurate, 0.2 g of triphenylphosphite and 200 g of xylene were charged and heated under stirring under a blanket of nitrogen to 240° C. within two hours. Water was removed by azeotropic distillation at 240° C. and under atmospheric pressure until an acid number of less than 5 mg/g was reached. Then, 21 g of coconut oil fatty acid were added, and the xylene circulation was maintained until the acid number of less than 5 mg/g was again attained. The solvent was then removed, by distillation under reduced pressure, keeping this temperature constant. A liquid reaction product having a mass fraction of solids of 96% and a dynamic viscosity of 336 mPa·s. The ratio of the number of hydroxyl groups in the polypropylene glycol to the number of acid groups in stearic and coconut oil fatty acids was 2:0.4.

Example 3

Preparation of an Ester Defoamer D3

Into a heated reaction vessel equipped with a stirrer, a reflux condenser, a water trap, and a nitrogen inlet, 2000 g of polypropylene glycol having a number average molar mass $M_n$ of 2000 g/mol, 358 g of stearic acid, 0.2 g of dibutyltin dilaurate, 0.2 g of triphenylphosphite and 200 g of xylene were charged and heated under stirring under a blanket of nitrogen to 240° C. within two hours. Water was removed by azeotropic distillation at 240° C. and under atmospheric pressure until an acid number of less than 5 mg/g was reached. Then, 83 g of coconut oil fatty acid were added, and the xylene circulation was maintained until the acid number of less than 5 mg/g was again attained. The solvent was then removed, by distillation under reduced pressure, keeping this temperature constant. A liquid reaction product having a mass fraction of solids of 91% and a dynamic viscosity of 303 mPa·s. The ratio of the number of hydroxyl groups in the polypropylene glycol to the number of acid groups in stearic and coconut oil fatty acids was 2:1.65.

Example 4

Preparation of an Ester Defoamer D4

Into a heated reaction vessel equipped with a stirrer, a reflux condenser, a water trap, and a nitrogen inlet, 400 g of polypropylene glycol having a number average molar mass $M_n$ of 400 g/mol, 224 g of stearic acid, 0.2 g of dibutyltin dilaurate, 0.2 g of triphenylphosphite and 200 g of xylene were charged and heated under stirring under a blanket of nitrogen to 240° C. within two hours. Water was removed by azeotropic distillation at 240° C. and under atmospheric pressure until an acid number of less than 5 mg/g was reached. Then, 52 g of coconut oil fatty acid were added, and the xylene circulation was maintained until the acid number of less than 5 mg/g was again attained. The solvent was then removed, by distillation under reduced pressure, keeping this temperature constant. A liquid reaction product having a mass fraction of solids of 98% and a dynamic viscosity of 130 mPa·s. The ratio of the number of hydroxyl groups in the polypropylene glycol to the number of acid groups in stearic and coconut oil fatty acids was 2:1.

Example 5

Preparation of an Ester Defoamer D5

Into a heated reaction vessel equipped with a stirrer, a reflux condenser, a water trap, and a nitrogen inlet, 900 g of polypropylene glycol having a number average molar mass $M_n$ of 900 g/mol, 224 g of stearic acid, 0.2 g of dibutyltin dilaurate, 0.2 g of triphenylphosphite and 200 g of xylene were charged and heated under stirring under a blanket of nitrogen to 240° C. within two hours. Water was removed by azeotropic distillation at 240° C. and under atmospheric pressure until an acid number of less than 5 mg/g was reached. Then, 52 g of coconut oil fatty acid were added, and the xylene circulation was maintained until the acid number of less than 5 mg/g was again attained. The solvent was then removed, by distillation under reduced pressure, keeping this temperature constant. A liquid reaction product having a mass fraction of solids of 95% and a dynamic viscosity of 60 mPa·s. The ratio of the number of hydroxyl groups in the polypropylene glycol to the number of acid groups in stearic and coconut oil fatty acids was 2:1.

Example 6

Preparation of an Ester Defoamer D6

Into a heated reaction vessel equipped with a stirrer, a reflux condenser, a water trap, and a nitrogen inlet, 4000 g of polypropylene glycol having a number average molar mass $M_n$ of 4000 g/mol, 224 g of stearic acid, 0.2 g of dibutyltin dilaurate, 0.2 g of triphenylphosphite and 200 g of xylene were charged and heated under stirring under a blanket of nitrogen to 240° C. within two hours. Water was removed by azeotropic distillation at 240° C. and under atmospheric pressure until an acid number of less than 5 mg/g was reached. Then, 52 g of coconut oil fatty acid were added, and the xylene circulation was maintained until the acid number of less than 5 mg/g was again attained. The solvent was then removed, by distillation under reduced pressure, keeping this temperature constant. A liquid reaction product having a mass fraction of solids of 96% and a dynamic viscosity of 690 mPa·s. The ratio of the number of hydroxyl groups in the polypropylene glycol to the number of acid groups in stearic and coconut oil fatty acids was 2:1.

Example 7

Precipitation of Wax in the Presence of an Emulsifier

In a heated reaction vessel V1 equipped with stirrer, reflux condenser and nitrogen inlet, in seven different runs denoted as E1 to E7, 58 g each of the ester defoamers D1 to D6 as prepared according to examples 1 to 6, and an unesterfied polypropylene glycol hereinafter referred to as D7, having a number average molar mass $M_n$ of 2000 g/mol, 8 g of an ethoxylated fatty acid as emulsifier (®Emulsogen A, Clariant Deutschland GmbH) and 3.5 g of an amide wax (ethylenediamine distearate, ®Licowax C Powder, Clariant Deutschland GmbH) were charged and heated under stirring under a nitrogen blanket during ninety minutes to 125° C., and stirring was continued until a clear melt had formed. In a second vessel V2 equipped with stirrer and cooling jacket, 138.5 g of the ester defoamers D1 to D6 of Examples 1 to 6, and of the unmodified polypropylene glycol D7, were charged and heated to 26° C. Under vigorous stirring in reaction vessel V2, the melt of vessel V1 was discharged into vessel V2 within five minutes, vessel V2 thereby assuming a interior temperature of 56° C. Whitish-turbid products were obtained having a dynamic viscosity in the range of from 100 mPa·s to 1500 mPa·s.

Example 8

Precipitation of Wax in the Presence of an Emulsifier

In a heated reaction vessel V1 equipped with stirrer, reflux condenser and nitrogen inlet, 58 g of the ester defoamer D1 and 3.5 g of an amide wax (ethylenediamine distearate, ®Licowax C Powder, Clariant Deutschland GmbH) were charged and heated under stirring under a nitrogen blanket during ninety minutes to 125° C., and stirring was continued until a clear melt had formed. In a second vessel V2 equipped with stirrer and cooling jacket, 138.5 g of the ester defoamer D1 of Example 1 were charged and heated to 26° C. Under vigorous stirring in reaction vessel V2, the melt of vessel V1 was discharged into vessel V2 within five minutes, vessel V2 thereby assuming a interior temperature of 56° C. A whitish-turbid product E8 was obtained having a dynamic viscosity of 671 mPa·s.

Example 9

200 g of the product of Example 7, run E5, were mixed with 100 g of the product of Example 7, run E6, and homogenised for thirty minutes. A whitish-turbid product E9 was obtained having a dynamic viscosity of 510 mPa·s.

Example 10

Preparation of a Two-Pack Coating Composition for Airless Application

The following formulation was used:
Part 1: A mixture was prepared from three premixes,
premix A comprising 335.4 g of an epoxy resin dispersion (®Beckopox EP386w/52 WA, Cytec Surface Specialties Austria GmbH), 10 g of a pigment dispersing and wetting agent (®Additol VXW 6394, Cytec Surface Specialties Austria GmbH), 5 g of a flow modifier (®Modaflow 9200, Cytec Industries Inc.), 5 g of a defoamer (for the individual runs: D1 from example 1, E1 to E7 from example 7, E 8 and E9 from examples 8 and 9, respectively), and 65.7 g of fully deionised water,
premix B comprising 75.9 g of talcum (®Micro Talk IT extra, Mondo Minerals BV), 267.7 g of titanium dioxide pigment (®Kronos 2190, Kronos Titan), 3 g of a yellow iron oxide pigment (®Bayferrox 3920, Lanxess Deutschland GmbH), 11.1 g of a black iron oxide pigment (®Bayferrox 306, Lanxess Deutschland GmbH), and 210.1 g of barium sulphate with average particle diameter of approximately 3 µm (EWO-S, Sachtleben Chemie GmbH), and
premix C comprising 6.1 g of 2,2,4-trimethyl-1,3-pentanediol-monoisobutyrate (®Texanol, Eastman Chemical Company), 5 g of a second portion of defoamer [for the individual runs: D1 from example 1, E1 to E7 from example 7, E 8 and E9 from examples 8 and 9, respectively, a commercial mineral oil based defoamer M comprising mass fractions of 94% of mineral oil having a boiling range starting at more than 280° C., and a kinematic viscosity of 17 mm$^2$/s at 40° C.), 4% of an ethoxylated fatty acid having a HLB of 8, and 2% of a precipitated amide wax, a commercial silicone defoamer S1 based on a polyether-modified polydimethyl siloxane and a hydrophobic solid dispersed in mineral oil, and a commercial silicone defoamer S2 based on a polyether-modified polydimethyl siloxane and a hydrophobic solid in aqueous dispersion], 5 g of a polyurethane thickener (®Additol VXW 6388, Cytec Surface Specialties Austria GmbH), and 5 g of a paste resin (®Additol XW 6536, Cytec Surface Specialties Austria GmbH).

The individual constituents of part A were weighed into a beaker and homogenised well with a stirrer for five minutes at 1000 min$^{-1}$. Premix B was then added to the homogenised premix A and well mixed with a spatula. The mixture of premixes A and B was then filled into a double-walled pot of a dissolver kept at 23° C. under cooling, and mixed for sixty minutes using a dissolver disk operating at a rotation frequency of 3000 min$^{-1}$. The product temperature was thus kept well below 40° C. Premix C was added to the dissolver pot about ten minutes before the end, i.e. about fifty minutes later than the mixture of A and B.

Part 2 comprised 96.5 g of an aqueous amine curing agent (®Beckopox VEH 2188w/55 WA,
  Cytec Surface Specialties Austria GmbH), and 100 g of fully deionised water.

The coating composition comprising the mixture of parts 1 and 2 is prepared immediately before application thereof, by admixing the curing agent with a spatula. The amount of water used to dilute the amine curing agent is varied so that the application viscosity of the ready mixture is set to 1600 mPa·s.

Table 1 lists the coating compositions prepared in this example 10 with the different defoamers used, together with the results from the pinhole test (Example 11).

| Nr. | Defoamer | Supplier | Type of Defoamer | Number of Pinholes in 1/dm$^2$ |
|---|---|---|---|---|
| 10-1 | D1 (example 1) | | according to the invention | 5 |
| 10-2 | E1 (example 7) | | according to the invention | 1 |
| 10-3 | E8 (example 8) | | according to the invention | 3 |
| 10-4 | M1 mineral oil defoamer | | mineral oil, ethoxylated fatty acid, precipitated amide wax | 6 |
| 10-5 | S1 silicone defoamer (®Drewplus TS 4481) | Ashland | silicone defoamer based on a polyether-modified polydimethyl siloxane and hydrophobic solid in mineral oil | 7 |
| 10-6 | S2 Silicone defoamer | Tego | silicone defoamer based on a | >10 |

| Nr. | Defoamer | Supplier | Type of Defoamer | Number of Pinholes in $1/dm^2$ |
|---|---|---|---|---|
| | (®Airex 902 W) | | polyether-modified polydimethyl siloxane and hydrophobic solid dispersed in water | |
| 10-7 | PPG 2000 | | non-esterified polypropylene glycol $M_n$ = 2000 g/mol | >10 |
| 10-8 | — | | no defoamer added | >10 |
| 10-9 | E2 (example 7) | | according to the invention | 3 |
| 10-10 | E3 (example 7) | | according to the invention | 5 |
| 10-11 | E7 (example 7) | | non-esterified PPG + emulsified wax | >10 |
| 10-12 | E4 (example 7) | | according to the invention, but too low PPG Mn = 400 g/mol | >10 |
| 10-13 | E5 (example 7) | | according to the invention, but too low PPG Mn = 900 g/mol | >10 |
| 10-14 | E6 (example 7) | | according to the invention | 2 |
| 10-15 | E9 (example 9) | | according to the invention, low PPG Mn | >10 |

Example 11

Application Test of Airless Paints

The coating compositions prepared according to example 10 were applied using a "Shark M 3227" applicator as sold by Sata Spray mix company, with a pre-pressure of 7 bar (0.7 MPa), corresponding to a spray pressure of 224 bar (22.4 MPa), and an airless die of type 46/50 onto a perforated steel sheet, with continuously varying coating film thickness, corresponding to a dry film thickness range of from 60 μm to 200 μm. After spraying, the sheets were air dried in a vertical position, following forced drying for twenty minutes at 70° C. in horizontal position.

The coated sheets were inspected for pinholes, using the dry film thickness range of from 120 μm to 140 μm as measured with a film thickness meter (®byko-test 8500 basic Fe/NFe, Byk Gardner). The number of pinholes in an area of 1 $dm^2$ is stated in table 1 supra.

It can be seen that the defoamer effect in airless spray application sets in with a polypropylene glycol of Mn of at least 2000 g/mol. Fatty acid esters of polypropylene glycol of Mn of 400 g/mol and 900 g/mol were insufficient.

Example 12

Preparation of a Pigment Paste, and Measurement of Foam Volume in the Grinding Mixture Pigment pastes were prepared according to the following formulation:

TABLE 3

| Pigment Paste Formulation | |
|---|---|
| grinding resin (®Additol XW 6535, Cytec Surface Specialties Austria GmbH) | 32.20 g |
| fully deionised water | 25.60 g |
| preserving agent (®Additol VXW 6372, Cytec Surface Specialties Austria GmbH) | 0.20 g |
| defoamer (v.i.) | 2.00 g |
| yellow pigment (®Hostaperm gelb H 3 G, Clariant Deutschland GmbH) | 40.00 g |

Defoamers used were E1 to E6, E9, the commercial mineral oil defoamer M1, and the silicone defoamer S1 as detailed supra. Viscosity of the pigment pastes so prepared was within the range of 500 mPa·s to 1500 mPa·s.

The paste constituents were charged into a double-walled dissolver pot and homogenised for sixty minutes at a rotation speed of 3000 $min^{-1}$ in a laboratory bead mill under cooling to 23° C. Immediately thereafter, 50 g of the milled product were filled over a metal sieve into a glass cylinder where the height was recorded. The height in the glass cylinder is an indicator for the foam volume.

Pigment pastes prepared in accordance with example 12 comprise the defoamers as listed in the table infra. Dynamic viscosity of the pastes and fill height in the glass cylinders as a measure of foam generated are also listed.

TABLE 4

| Defoamer efficiency in pigment pastes | | | |
|---|---|---|---|
| Paste | Defoamer | dynamic viscosity in mPa · s | height in mL |
| 16 | E1 (example 7); Mn (PPG) = 2000; 2:1 | 1071 | 62 |
| 17 | E2 (example 7); Mn (PPG) = 2000; 2:0.4 | 1052 | 64 |
| 18 | E3 (example 7); Mn (PPG) = 2000; 2:1.65 | 981 | 59 |
| 19 | M1 | 759 | 74 |
| 20 | S1 | 1111 | 61 |
| 21 | no defoamer | 758 | 81 |
| 22 | E4 (example 7); Mn (PPG) = 400; 2:1 | 1012 | 67 |
| 23 | E5 (example 7); Mn (PPG) = 900; 2:1 | 1108 | 65 |
| 24 | E6 (example 7); Mn (PPG) = 4000; 2:1 | 1075 | 61 |
| 25 | E9 (example 9) | 1022 | 63 |

A marked influence of the defoamer used on foam generation can be seen; even though there is a slight rise in viscosity in pastes 16, 17, 18, 20, 22, 23, 24, and 25, a significant reduction in form generation can be seen. The effect is higher for higher molar mass of the polypropylene glycol (PPG) used, and also higher for a higher degree of esterification of the PPG.

It can be seen that the defoamers according to the invention provide a similar level of foam reduction as the defoamers of the state of the art, based on silicones. The defoamers according to the invention have the additional advantage that they are largely free from solvents, and avoid the interfacial adhesion problems common with silicon-based defoamers.

The invention claimed is:
1. A method of use of an ester AB as defoamer additive in aqueous coating compositions which method comprises add- ing the ester AB in the form of an aqueous emulsion to an aqueous coating composition, and applying the said aqueous coating composition including the ester AB via the airless spray method, wherein the ester AB is an ester of a polypropylene glycol A with fatty acids B, wherein the polypropylene glycol A is a linear homopolymer having the structure HO—[CH(CH$_3$)—CH$_2$—O—]$_n$H, wherein n is chosen such that the number average molar mass $M_n$ is at least 1800 g/mol, and wherein the fatty acids B are a mixture of at least one of saturated fatty acids B1 having from 12 to 20 carbon atoms, with mixtures B2 of fatty acids derived from natural sources.

2. The method of use of claim 1, wherein a wax C is added to the ester AB.

3. The method of use of claim 1, wherein an emulsifier D is added to the ester AB.

4. The method of use of claim 2, wherein an emulsifier D is added to the ester AB.

5. The method of use of claim 1 wherein the mixture of fatty acids B2 is selected from the group consisting of coconut oil fatty acid and cottonseed fatty acid, and combinations thereof.

6. The method of use of claim 1, wherein the ester AB has an average ratio of the number v(-OH) of non-esterified hydroxyl groups per molecule which remain as such in the ester, to the number v(O—CO—R) of esterified hydroxyl groups of not more than 9.

7. The method of use of claim 1, wherein in the ester AB, the polypropylene glycol A has a number average molar mass $M_n$ of at least 1900 g/mol.

8. The method of use of claim 1, wherein in the ester AB, the polypropylene glycol A has a number average molar mass $M_n$ of at least 1950 g/mol.

9. The method of use of claim 1, wherein in the ester AB, the polypropylene glycol A has a number average molar mass $M_n$ of at least 2000 g/mol.

10. The method of use of claim 1, wherein in the ester AB, the fatty acid B is a mixture of B1 and B2 where the said fatty acid B1 has a mass fraction of at least 25%, in the mass of the mixture of the fatty acid B1 with the mixture of fatty acids B2.

11. The method of use of claim 1, wherein in the ester AB, the fatty acid B is a mixture of B1 and B2 where the said fatty acid B1 has a mass fraction of at least 40%, in the mass of the mixture of the fatty acid B1 with the mixture of fatty acids B2.

12. The method of use of claim 1, wherein the fatty acid B1 is stearic acid.

13. The method of use of claim 1, wherein the fatty acid B1 is stearic acid, and wherein the mixture of fatty acids B2 is coconut oil fatty acid.

* * * * *